United States Patent
Drake

(10) Patent No.: US 10,316,913 B2
(45) Date of Patent: Jun. 11, 2019

(54) VEHICLE BRAKE DRUMS HAVING BRAKING WALLS ENHANCED WITH COMPRESSIVE STRESSES

(71) Applicant: Webb Wheel Products, Inc., Cullman, AL (US)

(72) Inventor: Will Brandon Drake, Cullman, AL (US)

(73) Assignee: Webb Wheel Products, Inc., Cullman, AL (US)

( * ) Notice: Subject to any disclaimer, the term of this patent is extended or adjusted under 35 U.S.C. 154(b) by 5 days.

(21) Appl. No.: 15/272,528

(22) Filed: Sep. 22, 2016

(65) Prior Publication Data

US 2017/0089414 A1 Mar. 30, 2017

Related U.S. Application Data

(60) Provisional application No. 62/222,914, filed on Sep. 24, 2015.

(51) Int. Cl.
*F16D 51/00* (2006.01)
*F16D 65/10* (2006.01)

(52) U.S. Cl.
CPC ............ *F16D 65/10* (2013.01); *F16D 51/00* (2013.01); *F16D 2250/0061* (2013.01); *F16D 2250/0084* (2013.01)

(58) Field of Classification Search
CPC .. F16D 65/10; F16D 2250/0084; F16D 51/00; F16D 2250/0061
USPC ............... 188/74, 75, 76, 77 R, 77 W, 218 R
See application file for complete search history.

(56) References Cited

U.S. PATENT DOCUMENTS

| | | | |
|---|---|---|---|
| 2,081,605 A | 5/1937 | Sinclair | |
| 2,398,501 A | 4/1946 | Le Jeune | |
| 2,558,297 A * | 6/1951 | Horn | F16D 65/10 188/218 R |
| 2,897,925 A | 8/1959 | Strohm | |
| 3,841,448 A | 10/1974 | Norton | |
| 4,536,936 A | 8/1985 | Williams | |
| 4,858,731 A | 8/1989 | Bush | |
| 5,115,891 A * | 5/1992 | Raitzer | B22D 19/02 164/112 |
| 5,259,486 A * | 11/1993 | Deane | B22D 19/02 188/218 A |
| 5,352,305 A | 10/1994 | Hester | |
| 6,241,056 B1 * | 6/2001 | Cullen | B22D 19/00 188/218 R |
| 6,530,458 B1 | 3/2003 | Rau, III | |
| 7,836,938 B2 * | 11/2010 | Agarwal | F16F 7/00 164/100 |

(Continued)

OTHER PUBLICATIONS

International Search Report and Written Opinion for PCT/US2016/053248 dated Dec. 8, 2016.

*Primary Examiner* — Pamela Rodriguez
(74) *Attorney, Agent, or Firm* — Andrus Intellectual Property Law, LLP

(57) ABSTRACT

A brake drum for a vehicle braking system includes a closed end, an open end opposite the closed end, a braking wall axially extending between the open end and the closed end, and a compression device that applies a radial compressive force to the braking wall thereby increasing the thermomechanical fatigue resistance of the braking wall. A first restraining tab on the braking wall to axially restrain the compression device on the braking wall.

18 Claims, 7 Drawing Sheets

(56) References Cited

U.S. PATENT DOCUMENTS 9,163,682 B2 * 10/2015 Dessouki ............ F16D 65/0006
9,500,242 B2 * 11/2016 Monsere ............. F16D 65/0006

* cited by examiner

REPLACEMENT SHEET

5/7

VEHICLE BRAKE DRUMS HAVING BRAKING WALLS ENHANCED WITH COMPRESSIVE STRESSES

CROSS-REFERENCE TO RELATED APPLICATIONS

The present application claims priority to U.S. Provisional Application No. 62/222,914 filed on Sep. 24, 2015, which is hereby incorporated herein by reference.

FIELD

The present disclosure relates to vehicle brake drums, specifically vehicle brake drums having braking walls enhanced with a radial compressive force.

BACKGROUND

The following U.S. Patents are hereby incorporated by reference in entirety.

U.S. Pat. No. 2,081,605 discloses brake drums and refers more particularly to brake drums of the type employed in association with internal expanding vehicle brakes.

U.S. Pat. No. 2,398,501 discloses brake drums, and particularly a composite sheet metal and cast metal brake drum having the sheet metal disposed to reinforce and guard against breaking of the cast portions of the drum as placed in service.

U.S. Pat. No. 2,897,925 discloses a reinforced cast brake drum of iron, steel or ferrous alloy and a method of conditioning used brake drums for re-use and a cast brake drum having a reinforced construction which is directed to the end of eliminating failure by reason of heat checking.

U.S. Pat. No. 3,841,448 discloses a brake drum for motor vehicle wheels having an encompassing band of high tensile metal, such as steel, embedded in and bonded to the cast metal forming the main body of the drum to minimize circumferential end expansion or bell-mounting of the drum, to reduce cracking of the cast metal, and to retain the drum in serviceable condition if cracks should develop.

U.S. Pat. No. 4,536,936 discloses a method of forming a brake drum that includes casting an iron cylindrical braking drum with a flange end and an opened end to include a plurality of generally axially extending fins around an exterior surface thereof. The casting includes providing the fins with radially extending side walls which diverge along a length thereof from the opened end to a widest distance therebetween at a predetermined location from the opened end and converge along the length thereof from the predetermined location to the flange end. Accordingly, adjacent side walls of adjacent fins define a space therebetween having its narrowest portion at the predetermined location. A braking surface is machined about an interior of the cylindrical braking drum. A top of the fins is machined at either side of the predetermined location to include a shoulder at the end thereof away from the opened end. A steel band is formed and secured to the braking drum at the top of the fins to encircle the braking drum at the predetermined location.

SUMMARY

This Summary is provided herein to introduce a selection of concepts that are further described herein below in the Detailed Description. This Summary is not intended to identify key or essential features from the claimed subject matter, nor is it intended to be used as an aid in limiting the scope of the claimed subject matter.

In certain examples, a brake drum for a vehicle braking system comprises a closed end, an open end opposite the closed end, a braking wall axially extending between the open end and the closed end, and a compression device that applies a radial compressive force to the braking wall thereby increasing a thermo-mechanical fatigue resistance of the braking wall.

In certain examples, a brake drum for a vehicle braking system comprises a closed end; an open end opposite the closed end; a braking wall axially extending between the open end and the closed end; a first restraining tab on the braking wall and configured to axially restrain the compression band on the braking wall; and a compression band that compresses the braking wall with a desired radial compressive force to thereby increase the thermo-mechanical fatigue resistance of the braking wall. The first restraining tab encircles the outer surface of the braking wall and defines an opening. The compression band comprises an alignment indicia and a misalignment indicia positioned adjacent to the alignment indicia such that the alignment indicia aligns with the opening when the compression band compresses the braking wall with a desired radial compressive force. The alignment indicia becomes misaligned with the opening and the misalignment indicia aligns with the opening when the compression band does not apply the desired radial compressive force on the braking wall.

In certain examples, a method for increasing the thermo-mechanical fatigue resistance of a braking wall of a brake drum including positioning a compression device on the braking wall of the braking drum and compressing the compression device to apply a radial compressive force on the braking wall.

BRIEF DESCRIPTION OF THE DRAWINGS

Examples are described with reference to the following drawing figures. Like reference numbers are used throughout the drawing figures to reference like features and components.

DETAILED DESCRIPTION OF THE DRAWINGS

In the present disclosure, certain terms have been used for brevity, clearness and understanding. No unnecessary limitations are to be implied therefrom beyond the requirement of the prior art because such terms are used for descriptive purposes only and are intended to be broadly construed. The different apparatuses and methods described herein may be used alone or in combination with other apparatuses and methods. Various equivalents, alternatives and modifications are possible within the scope of the appended claims.

Figure 1:
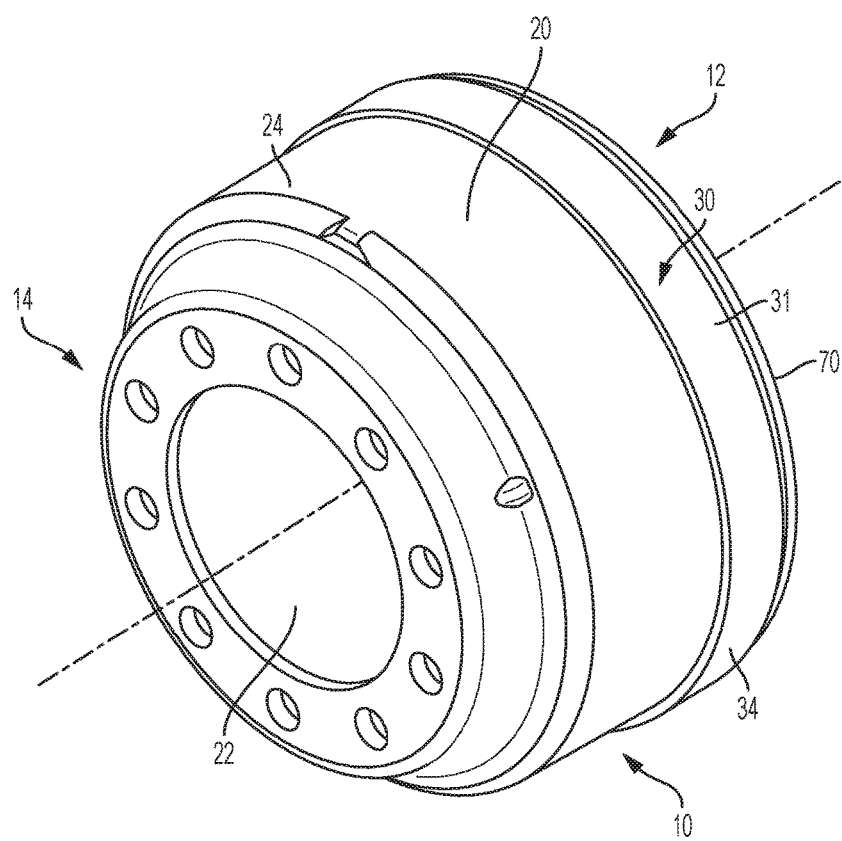
FIG. 1 is a perspective view of an example brake drum.

FIG. 1 depicts a brake drum 10 for a vehicle braking system. The brake drum 10 comprises an open or first end 12, a closed or second end 14, and a braking wall 20 that is elongated or axially extends between the open end 12 and the closed end 14. The braking wall 20 has an inner or braking surface 22 and an outer or exterior surface 24 opposite the braking surface 22. The brake drum 10 is of the type conventionally used in on-highway vehicles such as semi-trucks and other heavy haulers. Conventional brake drums are manufactured by Webb Wheel Products, Inc. (model number 66864B) and Gunite (model number 3600A).

Typically, a brake drum 10 and a vehicle tire (not shown) are connected to a vehicle axle via a hub. When a user activates the braking system, brake pads frictionally engage with the braking surface 22 of the brake drum 10 to thereby slow the rotation of the brake drum 10 and the corresponding wheel. Under such braking conditions, the braking surface 22 experiences both pressure forces and frictional forces from the braking system, which increase the temperature of the braking surface 22 and brake drum 10. Under severe loading, continued use, and/or cyclical use, thermo-mechanical fatigue and/or micro-cracks can develop on the braking surface 22 (otherwise known as "heat-checking"). Over time, the heat and mechanical loads can cause the micro-cracks to increase in size and coalesce into larger fissures along the braking surface 22. If the brake drum 10 continues to remain in service, the fissures will continue to grow until the structural integrity of the brake drum 10 is compromised to such a degree that the brake drum 10 fails and/or the braking system fails to function properly.

Traditional methods of mitigating heat-checking have included increasing the thickness of the braking wall 20 and/or adding material layers to the braking wall 20. Through research and experimentation, the present inventor has determined that when the brake drum 10 is initially cast, residual compressive stresses in a squealer band and/or the braking wall 20 play a critical role in establishing and prolonging the structural integrity in the brake drum 10. The present inventor has thus determined that applying additional compressive stresses to the brake drum 10 can dramatically increase thermo-mechanical fatigue resistance of the brake drum 10. The inventor has also determined that it is possible to apply a radial compressive force to the braking wall 20 of the brake drum 10 via a compressive device 30, thereby enhancing the compressive stresses in the braking wall 20. In some examples, the inventor has determined that it is desirable and possible to induce compressive stresses throughout an affected cross-section of the braking wall 20 of the brake drum 10. Further, in some examples, the inventor has determined it is desirable and possible to induce compressive stresses in a direction radial to the brake drum 10.

Referring to FIG. 1, a compression device 30 is coupled to and/or compresses the brake drum 10. The type of compression device 30 can vary and in this example comprises a compression band 31. In other examples, the compression device 30 can include high tension wire-wrapping, built-up sections, autofrettage, and/or the like. The compression band 31 is mechanically tightened around the braking wall 20 so as to apply or induce compressive stresses in the braking wall 20 and thereby increase the thermo-mechanical fatigue resistance of the brake drum 10. The compression band 31 can be made from any suitable material including steel, alloy, aluminum, ceramic, plastic, and/or the like.

In certain examples, the compression band 31 is a ring and is wrapped around or encircles the outer surface 24 of the braking wall 20 such that the compression band 31 is disposed on and radially compresses the braking wall 20. The compression band 31 can be equally-sized, undersized, or oversized when compared to the dimensions of the braking wall 20. The compression band 31 can be coupled or connected to the brake drum 10 by stretching, shrink fitting, press fitting, adhesives, welding, mechanical devices, and/or the like. The axial width of the compression band 31 can vary, and the compression band 31 includes a pair of opposing side surfaces 33 (see FIG. 3A) each having a side depth.

In other examples, the compression band 31 can comprise a plurality of disconnected positions that are connected together by mechanical connectors such as lever-actuated bands, screws, bolts, and/or the like such that the compression band 31 can be incrementally tightened around the brake drum 10 to apply a desired or preselected radial compressive force. The compression band 31 can be a ring with one or more projecting portions that project radially away from the braking wall 20. The projecting portions can be clamped, screwed, bolted, and/or the like to incrementally apply the compressive force to the braking wall 20.

The radial compressive force applied by the compression band 31 can vary. In some examples, an optimal or desired compressive force applied by the compression band 31 is between 2.0 kpsi to 10.0 kpsi (e.g. the desired compressive force applied by the compression band 31 is 5.0 kpsi). The brake drum 10 can have different weights, dimensions, braking wall 20 thicknesses, components, squealer bands, and/or the like, and thus the optimal compressive force may vary based on the characteristics of the brake drum 10.

Figure 2A:
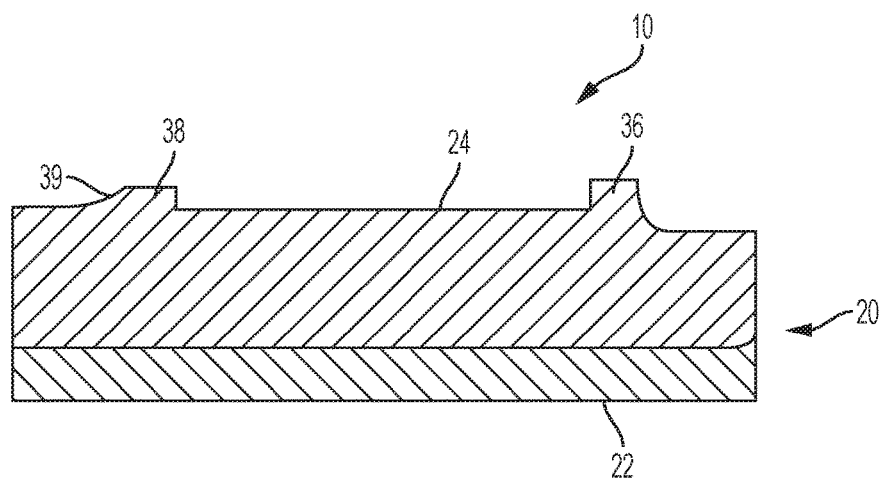
FIGS. 2A-2B are partial cross-sectional views of example brake drums.
Figure 2B:
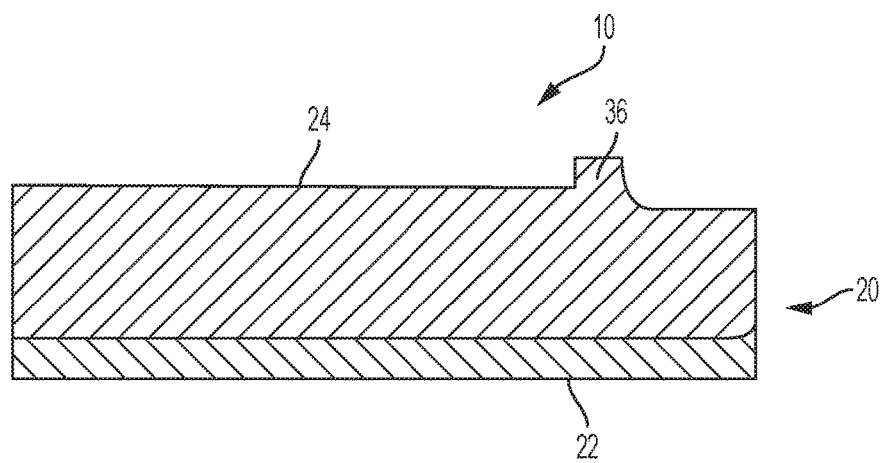

Referring to FIGS. 2A-2B, the brake drum 10 can comprise one or more restraining tabs that project radially outwardly from the braking wall 20 to restrain the compression band 31 on the brake drum 10. FIG. 2A depicts a first restraining tab 36 and a second restraining tab 38. The first restraining tab 36 is positioned closer to the open end 12 than the closed end 14, and the second restraining tab 38 is positioned between the closed end 14 and the first restraining tab 36. The first restraining tab 36 and/or the second restraining tab 38 are positioned on the outer surface 24. The length and shape of the restraining tabs 36, 38 can vary. In one example, the restraining tabs 36, 38 are annular and encircle (or is otherwise continuous along) the outer surface 24 of the braking wall 20.

In use, the compression band 31 is positioned between the first restraining tab 36 and the second restraining tab 38. The restraining tabs 36, 38 axially restrain the compression band 31 on the braking wall 20 when the compression band 31 compresses the braking wall 20 with the desired radial compressive force (i.e. the retaining tabs 36, 38 prevent the compression band 31 from axially moving too far along the braking wall 20). The restraining tabs 36, 38 can be any suitable shape including curved, rectangular, and/or the like. The restraining tabs 36, 38 can be formed with and/or integral to the brake drum 10. The restraining tabs 36, 38 can be continuous rings, intermittent segments, or separate portions. In the example depicted in FIG. 2A, the second restraining tab 38 has a sloped surface 39 that allows the compression band 31 to slide along and past the sloped surface 39 and the second restraining tab 38 and into position between the first restraining tab 36 and the second restraining tab 38 when the compression band 31 is installed on the braking wall 20 (i.e. the compression band 31 axially slides along the braking wall 20 from the closed end 14 towards the open end 12). In another example, shown in FIG. 2B, a brake drum 10 comprises only a first restraining tab 36.

Figure 3A:
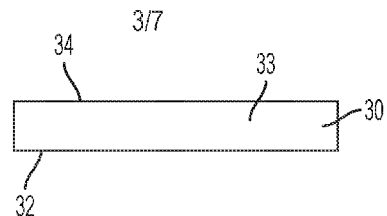
FIG. 3A-3E are cross-sectional views of example compression bands.
Figure 3B:
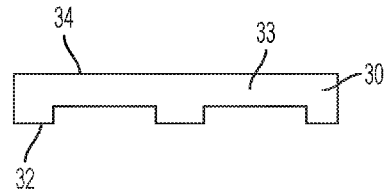
Figure 3C:
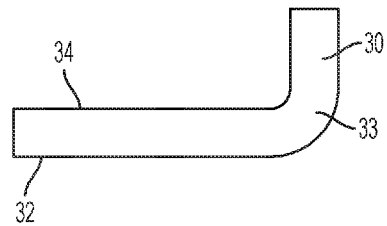
Figure 3D:
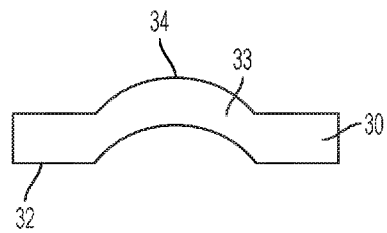
Figure 3E:
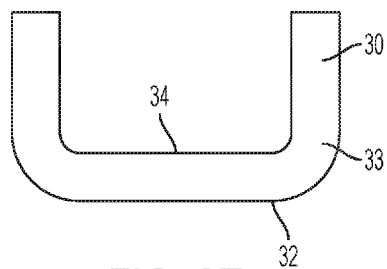

Referring to FIGS. 3A-3E, the compression band 31 can have any suitable shape. The compression band 31 can comprise a lower surface 32, an upper surface 34, and at least one side surface 33 that extends between the lower surface 32 and the upper surface 34. The lower surface 32 is orientated toward the braking wall (i.e. the lower surface 32 is closer to the braking wall 20 than the upper surface 34). Non-limiting examples of the compression band 31 are depicted in FIGS. 3A-3E. FIG. 3A depicts a compression band 31 having a rectangular cross-section. FIG. 3B depicts a compression band 31 having a rectangular cross-section with a plurality of cutouts adjacent to the lower surface 32. FIG. 3C depicts a compression band 31 having an "L"-shaped cross-section. FIG. 3D depicts a compression band having a cross-section with a curved center portion. FIG. 3E depicts a compression band 31 having a "U"-shaped cross-section.

Figure 4A:
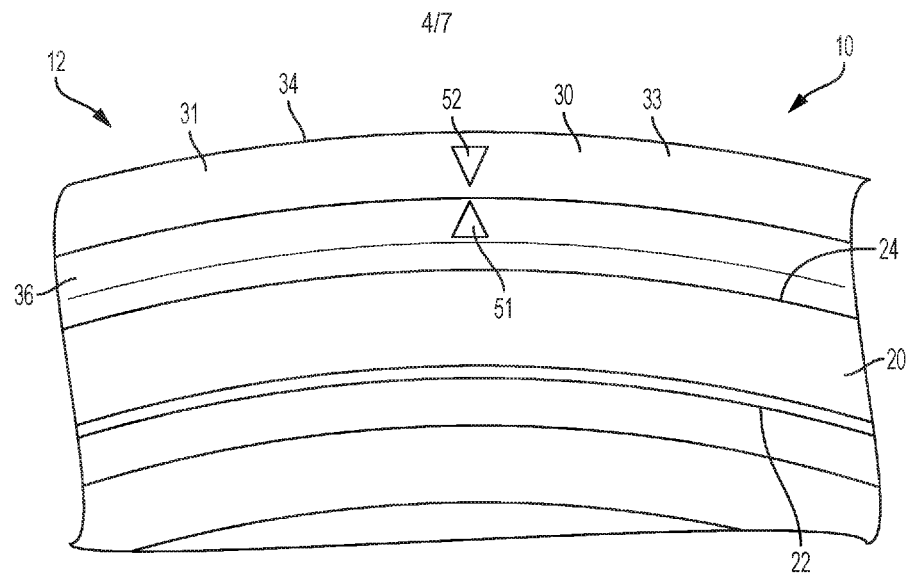
FIG. 4A is a partial end view of an example brake drum having a braking wall indicia on a first restraining tab aligned with a compression band indicia on a compression band.
Figure 4B:
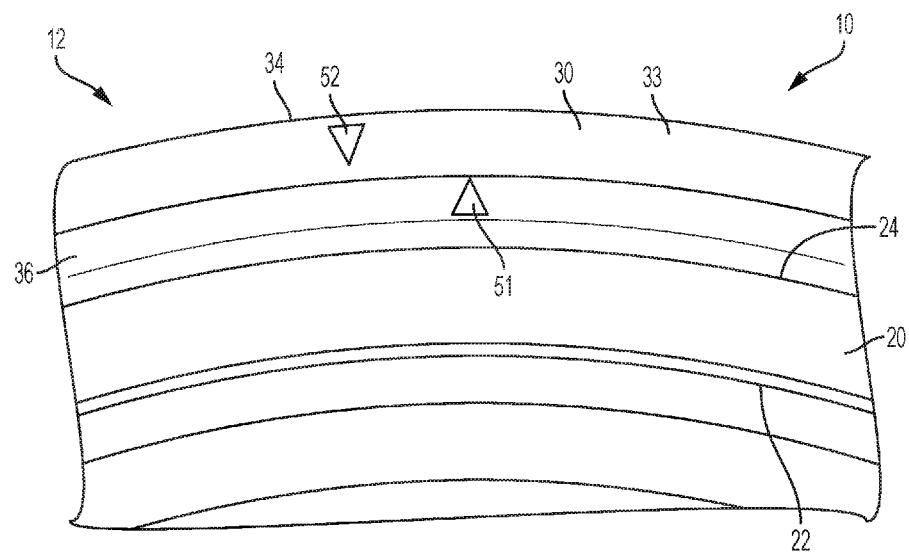
FIG. 4B is a partial end view of the brake drum of FIG. 4A with the braking wall indicia misaligned with the compression band indicia.
Figure 5:
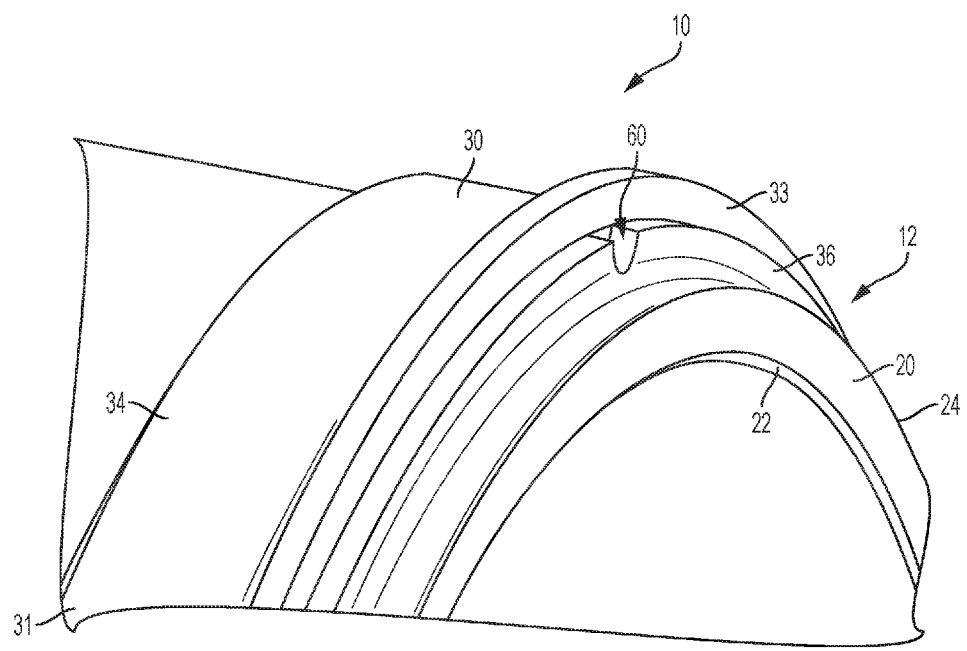
FIG. 5 is a partial perspective view of an example brake having a first retaining tab that defines an opening therein.
Figure 6A:
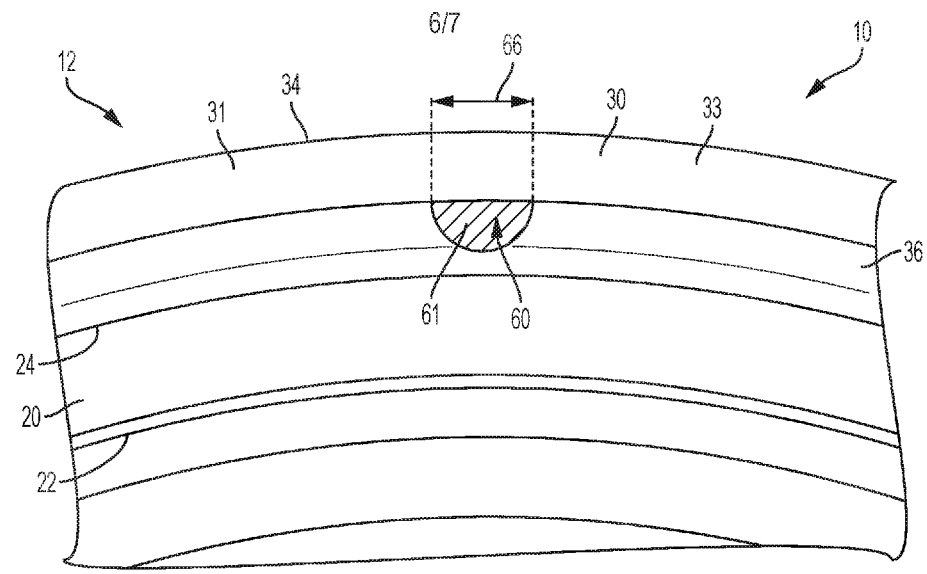
FIG. 6A is a partial end view of an example brake drum having a first retaining tab defining an opening therein and a compression band having an alignment indicia visible through the opening.
Figure 6B:
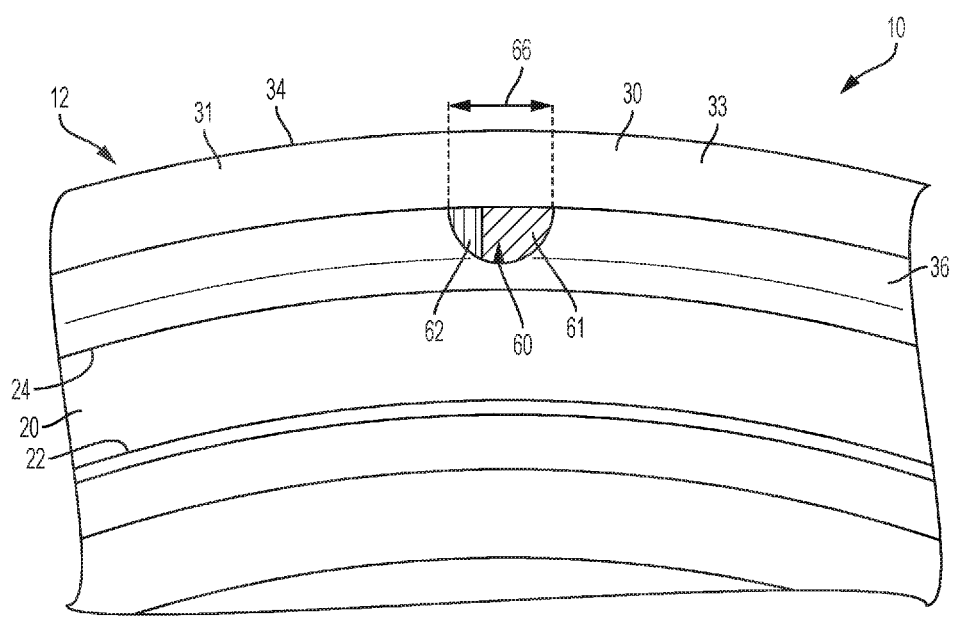
FIG. 6B is a partial end view of the brake drum of FIG. 6A with a misalignment indicia of the compression band visible through the opening.

Referring to FIGS. 4A-4B, the brake drum 10 has a brake drum indicia 51 and the compression band 31 has a compression band indicia 52. The brake drum indicia 51 and the compression band indicia 52 are aligned when the compression band 31 applies or radially compresses the braking wall 20 with a desired radial compressive force. The compression band indicia 52 becomes misaligned relative to the brake drum indicia 51 when the compression band 31 is not applying the desired radial compressive force on the braking wall.

Misalignment of the brake drum indicia 51 and the compression band indicia 52 allows an inspector to visually determine that the compression force applied by the compression band 31 is not at the desired amount (e.g. has decreased). That is when the radial compressive force acting on the compression band 31 and/or braking wall 20 decreases, relative motion between the compression band 31 and the brake drum 10 occurs such that the brake drum indicia 51 and the compression band indicia 52 misalign (see FIG. 4B). The brake drums 10 that are observed with misaligned brake drum indicia 51 and the compression band indicia 52 can be taken out of operable service for repair and/or replacement. The brake drum indicia 51 and the compression band indicia 52 remain aligned so long as the radial compressive force applied by the compression band 31 is sufficient to restrain the compression band 31 in place on the braking wall 20 during brake application (see FIG. 4A).

The position of the brake drum indicia 51 and the compression band indicia 52 can vary. In the example depicted in FIGS. 4A-4B, the brake drum indicia 51 is positioned on the first restraining tab 36 of the brake drum 10 and the compression band indicia 52 is positioned on the side surface 33 of the compression band 31. In other examples, the brake drum indicia 51 is positioned on the outer surface 24, the second restraining tab 38, a lip the open end 12, and/or an end surface of the braking wall 20. In other examples, the compression band indicia 52 is positioned on a top surface of the compression band 31. The brake drum indicia 51 and the compression band indicia 52 can be applied to the brake drum 10 and the compression band 31, respectively, during formation (e.g. cast into, stamped on, machined) or after formation (e.g. adhesive, paint, etching) of the brake drum 10 and compression band 31, respectively.

Referring to FIGS. 5 and 6A-6C, the compression band 31 comprises an alignment indicia 61 having an alignment width 65 and a misalignment indicia 62 positioned adjacent to the alignment indicia 61. The brake drum 10 defines an opening 60 having an opening width 66. The alignment indicia 61 is aligned with the opening 60 when the compression band 31 compresses the braking wall 20 with the desired radial compressive force, and the alignment indicia 61 becomes misaligned with the opening 60 when the compression band 31 is not applying the desired radial compressive force (e.g. has decreased). In such case, the misalignment indicia 62 aligns with or is visible through the opening 60. That is, when the radial compressive force acting on the compression band 31 and/or braking wall 20 decreases, relative motion between the compression band 31 and the brake drum 10 occurs such that the alignment indicia 61 and the opening 60 misalign and the misalignment indicia 62 aligns or becomes visible through the opening 60 (see FIG. 6B). Brake drums 10 with the misalignment indicia 62 visible through the opening 60 can be taken out of operable service for repair and/or replacement. The alignment indicia 61 remains aligned with the opening 60 so long as the radial compressive force applied by the compression band 31 is sufficient to restrain the compression band 31 in place during brake application (see FIG. 6A). In certain examples, the alignment width 65 that is equal to the opening width 66.

Figure 7:
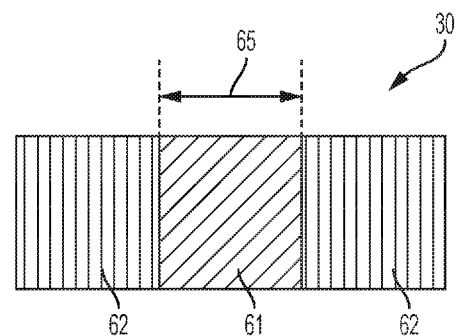
FIG. 7 is an example layout of the alignment indicia and the misalignment indicia for the compression band.

The position of the alignment indicia 61 and misalignment indicia 62 on the compression band 31 can vary. In the example depicted in FIGS. 6A-6B, the alignment indicia 61 and the misalignment indicia 62 are positioned on the side surface 33 of the compression band 31. The alignment indicia 61 and the misalignment indicia 62 can be applied to the compression band 31 during formation (e.g. cast into, stamped on, machined) or after forming (e.g. adhesive, paint, etching). FIG. 7. depicts an example layout of the alignment indicia 61 and the misalignment indicia 62 on the compression band 31. The position of the opening 60 can vary. In the example depicted in FIGS. 6A-6B, the opening 60 is defined in the first restraining tab 36. In other examples, the opening 60 is defined in an annular lip 70 or end wall of the brake drum 10. The opening 60 can be defined in the brake drum 10 during formation (e.g. cast into, stamped on, machined) or after formation (e.g. cutting, etching). In certain examples, multiple openings 60 are defined in the first restraining tab 36. In other examples, multiple alignment indicia 61 and/or misalignment indicia 62 are positioned on the compression band 31.

In certain examples, a method for increasing a thermomechanical fatigue resistance of the braking wall 20 of the brake drum 10 comprises positioning the compression device 30 on the braking wall 20 of the braking drum 10 and compressing the compression device 30 to apply a desired radial compressive force on the braking wall 20. The method can comprise positioning the brake drum indicia 51 on the braking wall 20 of the brake drum 10; positioning a compression band indicia 52 on the compression device 30; and/or aligning the compression band indicia 52 with the brake drum indicia 51 when the compression band 31 is positioned on the braking wall 20 of the braking drum 10, wherein the compression band indicia 52 becomes misaligned relative to the brake drum indicia 51 when the compression band 31 does not apply the desired radial compressive force on the braking wall.

The method can also comprise positioning the alignment indicia 61 and the misalignment indicia 62 on the compression device 30; defining the opening 60 in the first restraining tab 36 of the brake drum 10; and/or aligning the alignment indicia 61 with the opening 60 when the compression band 31 is positioned on the braking wall 20 of the braking drum 10 such that the alignment indicia 61 is visible through the opening 60, wherein the alignment indicia 61 becomes misaligned with the opening 60 and the misalignment indicia 62 aligns with the opening 60 when the compression band 31 does not apply the desired radial compressive force on the braking wall 20.

In certain examples, a brake drum for a vehicle braking system comprises a closed end, an open end opposite the closed end, and a braking wall axially extending between the open end and the closed end; and a compression device that compresses the braking wall with a desired radial compressive force to thereby increase the thermo-mechanical fatigue resistance of the braking wall. The compression device comprises a compression band, and the braking wall comprises an outer surface such that the compression band is disposed on and radially compresses the outer surface of the braking wall. In certain examples, the compression band is positioned nearer the open end than the closed end. In certain examples, the compression band has an "L"-shaped cross-section. The brake drum can comprise a first restraining tab on the braking wall to restrain the compression band on the braking wall and/or a second restraining tab on the braking wall and spaced apart form the first restraining tab. The first restraining tab and/or the second restraining tab axially restrain the compression band on the braking wall. In certain examples, the compression band is axially restrained on the braking wall between the first restraining tab and the second restraining tab. The first restraining tab and/or the second restraining tab can be annular and encircle the outer surface of the braking wall. The second restraining tab can comprise a sloped surface such that the compression band slides along and past the sloped surface when the compression band is installed on the braking wall.

In certain examples, the compression band comprises a compression band indicia and the braking wall comprises a brake drum indicia. The compression band indicia is aligned with the brake drum indicia when the compression band compresses the braking wall with the desired radial compressive force, and the compression band indicia becomes misaligned relative to the brake drum indicia when the compression band does not apply the desired radial compressive force on the braking wall.

In certain examples, the first restraining tab defines an opening (or multiple openings) therein and the compression band comprises an alignment indicia and a misalignment indicia positioned adjacent to the alignment indicia such that the alignment indicia aligns with the opening of the first restraining tab when the compression band compresses the braking wall with the desired radial compressive force. The alignment indicia becomes misaligned with the opening and the misalignment indicia aligns with the opening when the compression band does not apply the desired radial compressive force on the braking wall. The opening can be semicircular. The opening has an opening width and the alignment indicia has an indicia width that is equal to the opening width.

In certain examples, a brake drum for a vehicle braking system comprises a closed end; an open end opposite the closed end; a braking wall axially extending between the open end and the closed end; a first restraining tab on the braking wall and configured to axially to restrain the compression band on the braking wall; and a compression band that compresses the braking wall with a desired radial compressive force to thereby increase the thermo-mechanical fatigue resistance of the braking wall. The compression band comprises an alignment indicia and a misalignment indicia positioned adjacent to the alignment indicia, the alignment indicia aligns with the opening when the compression band compresses the braking wall with the desired radial compressive force, and wherein the alignment indicia becomes misaligned with the opening and the misalignment indicia aligns with the opening when the compression band does not apply the desired radial compressive force on the braking wall. A second restraining tab on the braking wall and configured to axially restrain the compression band on the braking wall, the second restraining tab being spaced apart from first restraining tab such that the compression band is axially restrained between the first restraining tab and the second restraining tab. The first restraining tab encircles the outer surface of the braking wall, and the second restraining tab encircles the outer surface of the braking wall.

What is claimed is:

1. A brake drum for a vehicle braking system, the brake drum comprising:
   a closed end, an open end opposite the closed end, and a braking wall axially extending between the open end and the closed end, the braking wall having an outer surface; and
   a compression device having a compression band disposed on the outer surface of the braking wall to radially compress the outer surface of the braking wall such that the compression band applies a radial compressive force to the braking wall thereby increasing a thermo-mechanical fatigue resistance of the braking wall;
   wherein the compression band comprises a compression band indicia and wherein the braking wall comprises a brake drum indicia;
   wherein the compression band indicia is aligned with the brake drum indicia when the compression band compresses the braking wall with a desired radial compressive force; and
   wherein the compression band indicia becomes misaligned with the brake drum indicia when the compression band does not apply the desired radial compressive force on the braking wall.

2. The brake drum according to claim 1, wherein the compression band has an "L"-shaped cross-section.

3. The brake drum according to claim 1, further comprising a first restraining tab on the braking wall and configured to axially restrain the compression band on the braking wall.

4. The brake drum according to claim 3, wherein the first restraining tab encircles the outer surface of the braking wall.

5. The brake drum according to claim 3, further comprising a second restraining tab on the braking wall and configured to axially restrain the compression band on the braking wall, the second restraining tab being spaced apart from first restraining tab such that the compression band is axially restrained on the braking wall between the first restraining tab and the second restraining tab.

6. The brake drum according to claim 5, wherein the first restraining tab encircles the outer surface of the braking wall and wherein the second restraining tab encircles the outer surface of the braking wall.

7. The brake drum according to claim 5, wherein the second restraining tab comprises a sloped surface, wherein when the compression band is installed on the braking wall the compression band slides along and past the sloped surface as the compression band axially slides along the braking wall from the closed end towards the open end.

8. A brake drum for a vehicle braking system, the brake drum comprising:
   a closed end, an open end opposite the closed end, a braking wall axially extending between the open end and the closed end, and a first restraining tab; and
   a compression device having a compression band that applies a radial compressive force to the braking wall thereby increasing a thermo-mechanical fatigue resistance of the braking wall, the compression band is axially restrained on the braking wall by the first restraining tab;
   wherein the first restraining tab defines an opening therein;
   wherein the compression band comprises an alignment indicia and a misalignment indicia positioned adjacent to the alignment indicia; and
   wherein the alignment indicia aligns with the opening of the first restraining tab when the compression band compresses the braking wall with a desired radial compressive force and wherein the alignment indicia becomes misaligned with the opening and the misalignment indicia aligns with the opening when the compression band does not apply the desired radial compressive force on the braking wall.

9. The brake drum according to claim 8, wherein the opening is semicircular.

10. The brake drum according to claim 8, wherein the opening has an opening width and wherein the alignment indicia has an indicia width that is equal to the opening width.

11. A brake drum for a vehicle braking system, the brake drum comprising:
   a closed end, an open end opposite the closed end, and a braking wall axially extending between the open end and the closed end;
   a compression band that compresses the braking wall with a desired radial compressive force to thereby increase a thermo-mechanical fatigue resistance of the braking wall, wherein the compression band comprises an alignment indicia and a misalignment indicia positioned adjacent to the alignment indicia; and
   a first restraining tab on the braking wall and configured to axially restrain the compression band on the braking wall, wherein the first restraining tab encircles an outer surface of the braking wall and defines an opening;
   wherein the alignment indicia aligns with the opening when the compression band compresses the braking wall with the radial compressive force; and
   wherein the alignment indicia becomes misaligned with the opening and the misalignment indicia aligns with the opening when the compression band does not apply the desired radial compressive force on the braking wall.

12. The brake drum according to claim 11, further comprising a second restraining tab on the braking wall and configured to axially restrain the compression band on the braking wall, wherein the second restraining tab being spaced apart from first restraining tab such that the compression band is axially restrained between the first restraining tab and the second restraining tab.

13. The brake drum according to claim 12, wherein the first restraining tab encircles the outer surface of the braking wall and wherein the second restraining tab encircles the outer surface of the braking wall.

14. A method for increasing a thermo-mechanical fatigue resistance of a braking wall of a brake drum, the method comprising:
   positioning a compression device on the braking wall of the braking drum; and
   tightening the compression device onto the braking wall prior to use of the brake drum to thereby apply a desired radial pre-stress compressive force of 2 Kpsi to 10 Kpsi on the braking wall that increases the thermo-mechanical fatigue resistance of the braking wall.

15. A method for increasing a thermo-mechanical fatigue resistance of a braking wall of a brake drum, the method comprising:
   positioning a compression device on the braking wall of the braking drum;
   radially compressing the compression device onto the braking wall prior to use of the brake drum to thereby apply a desired radial pre-stress compressive force on the braking wall that increases the thermo-mechanical fatigue resistance of the braking wall;
   positioning a brake drum indicia on the braking wall;
   positioning a compression band indicia on the compression device; and
   aligning the compression band indicia with the brake drum indicia when the compression device is positioned on the braking wall of the braking drum with the radial compressive force, wherein the compression band indicia becomes misaligned relative to the brake drum indicia when the compression device does not apply the desired radial compressive force on the braking wall.

16. A method for increasing a thermo-mechanical fatigue resistance of a braking wall of a brake drum, the method comprising:
   positioning a compression device on the braking wall of the braking drum;
   radially compressing the compression device onto the braking wall prior to use of the brake drum to thereby apply a desired radial pre-stress compressive force on the braking wall that increases the thermo-mechanical fatigue resistance of the braking wall;
   positioning an alignment indicia and a misalignment indicia on the compression device;
   defining an opening in a lip of the brake drum; and
   aligning the alignment indicia with the opening when the compression device is positioned on the braking wall of the braking drum with the radial compressive force such that the alignment indicia is visible through the opening, wherein the alignment indicia becomes misaligned with the opening and the misalignment indicia aligns with the opening when the compression device does not apply the desired radial compressive force on the braking wall.

17. A method for making a brake drum having increased thermo mechanical fatigue resistance, the method comprising:
   forming the brake drum such that the brake drum has a closed end, an open end opposite the closed end, and a braking wall axially extending between the open end and the closed end;
   positioning a compression device on the braking wall after the brake drum is formed; and
   tightening the compression device onto an outer surface of the braking wall prior to use of the brake drum to thereby apply a desired radial compressive force of 2

Kpsi to 10 Kpsi to the braking wall and thereby increase the thermo-mechanical fatigue resistance of the braking wall.

18. The method according to claim 17, wherein the brake drum has a first restraining tab and a second restraining tab axially spaced apart from each other on the braking wall, and wherein the first restraining tab and the second restraining tab axially restrain the compression device on the braking wall.

* * * * *